(12) United States Patent
Chao

(10) Patent No.: US 7,642,838 B2
(45) Date of Patent: Jan. 5, 2010

(54) VOLTAGE REDOUBLING CIRCUIT

(75) Inventor: Wen-Shyen Chao, Hsinchu (TW)

(73) Assignee: Holtek Semiconductor Inc., Hsinchu (TW)

( * ) Notice: Subject to any disclaimer, the term of this patent is extended or adjusted under 35 U.S.C. 154(b) by 0 days.

(21) Appl. No.: 12/054,233

(22) Filed: Mar. 24, 2008

(65) Prior Publication Data

US 2009/0219736 A1 Sep. 3, 2009

(30) Foreign Application Priority Data

Feb. 29, 2008 (TW) .................................. 97107132

(51) Int. Cl.
*G05F 1/10* (2006.01)
(52) U.S. Cl. .................. 327/536; 327/537; 327/535
(58) Field of Classification Search .................. None
See application file for complete search history.

(56) References Cited

U.S. PATENT DOCUMENTS 4,733,108 A * 3/1988 Truong ....................... 327/537
5,196,996 A * 3/1993 Oh .............................. 363/60

* cited by examiner

*Primary Examiner*—Lincoln Donovan
*Assistant Examiner*—Khareem E. Almo
(74) *Attorney, Agent, or Firm*—WPAT, PC; Justin King

(57) ABSTRACT

A voltage redoubling circuit, wherein said circuit relies on a voltage-detecting unit, an oscillating unit, an inversing unit, a first switching device, a second switching device, a third switching device, a fourth switching device, and a fifth switching device to pump a reference voltage to an output voltage. In such a way, a conducted memory cell can be quickly and accurately accessed via a circuit operated in a low voltage region by a single on-and-off signal rather than a number of pulse control signals.

8 Claims, 3 Drawing Sheets

VOLTAGE REDOUBLING CIRCUIT

BACKGROUND OF THE INVENTION

1. Field of the invention

The present invention relates to voltage redoubling circuit, more particularly to, the voltage redoubling circuit operated at a low voltage such that a conducted memory cell can be quickly and accurately accessed via a single on-and-off signal rather than a plurality of pulse control signals.

2. Description of the Related Art

With rapid advance of manufacturing, memory devices are the inevitable essential electronic parts for many electronic products nowadays. When a memory cell is read, its operating method is to compulsorily turn on row bits and numeric bits. If the memory cell to be read is of conducted memory cell and operated in the low voltage region, there is either insufficient voltage for row address to turn on the memory cell or insufficient current despite sufficient voltage to turn on the same. In the aforesaid situation the information restored in the memory cell cannot be correctly accessed. And while operating at low voltage region and pumping the voltage of row address to an even higher voltage than the operating voltage, the information restored in the memory unit of conducted memory cell operated in the low threshold voltage can be correctly accessed. In the high operating voltage region there is no need to pump the voltage of row address even higher than the operating voltage because the high operating voltage is high enough so that the conducted memory cell at low threshold voltage can be turned on. Also in high operating voltage region, the device may suffer from damage if the voltage of row address is pumped to a voltage even higher than the operating voltage. As a result in low operating voltage region, the voltage of row address must be pumped up to a voltage higher than the operating voltage such that the conducted memory cell at low voltage can be certainly accessed. In the high operating voltage region, the voltage of row address does not necessarily be pumped to the voltage higher than the operating voltage, that is to say; the conducted memory cell at low voltage can be certainly read without pumping and thus the damage to devices can be also prevented. However, the conventional art as aforementioned will take a number of pulse control signals to lead to the desirable improved result. For the concern of hardware die size, multiple pulse control signals will lead to corresponding multiple control signal sources, such that the die size shrink scale is limited. Meanwhile, a plurality of pulses operated in a small area will also possibly lead to mutual interferences such that the circuit cannot function properly.

Therefore, there exists a solid demand for a voltage redoubling circuit, which uses only a single on-and-off signal rather than pulse control signals to enable the circuit such that conducted memory cell can be quickly and correctly read at low voltage operation region.

SUMMARY OF THE INVENTION

In view of the disadvantages of prior art, the primary object of the present invention relates to address the issue of a number of pulse control signals for the conventional voltage redoubling circuit.

According to one of the aspect of the present invention, it relates a voltage redoubling circuit, comprising: a voltage-detecting unit; an oscillating unit, interconnected with said voltage-detecting unit; an inversing unit, interconnected with said voltage-detecting unit; a first switching device, interconnected with said inversing unit; a second switching device, interconnected with said inversing unit; a third switching device, interconnected with said first switching device and said second switching device; a fourth switching device, interconnected with said oscillating unit and said third switching device; and a fifth switching device, interconnected with said third device and said fourth device.

Relying upon the aforesaid, the present invention requires only a single on-and-off signal for the circuit operated at low voltage region such that the conducted memory cell can be correctly and quickly read via the circuit and the hardware die size can be further minimized and at the same time the signals in the circuit will not interfere mutually.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
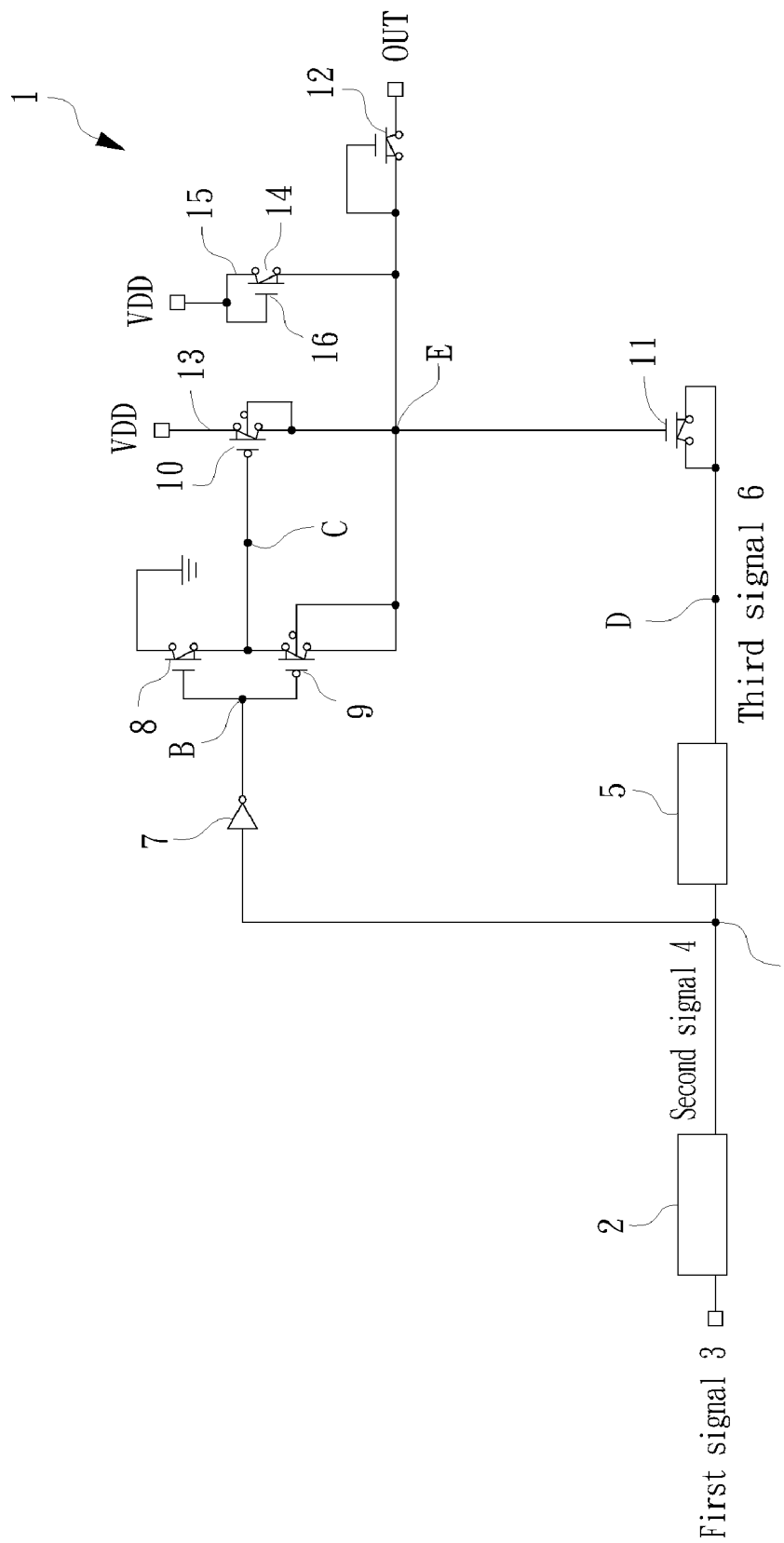
FIG. 1 is the circuit diagram of voltage redoubling circuit in view of a preferred embodiment of the present invention.
Figure 2:
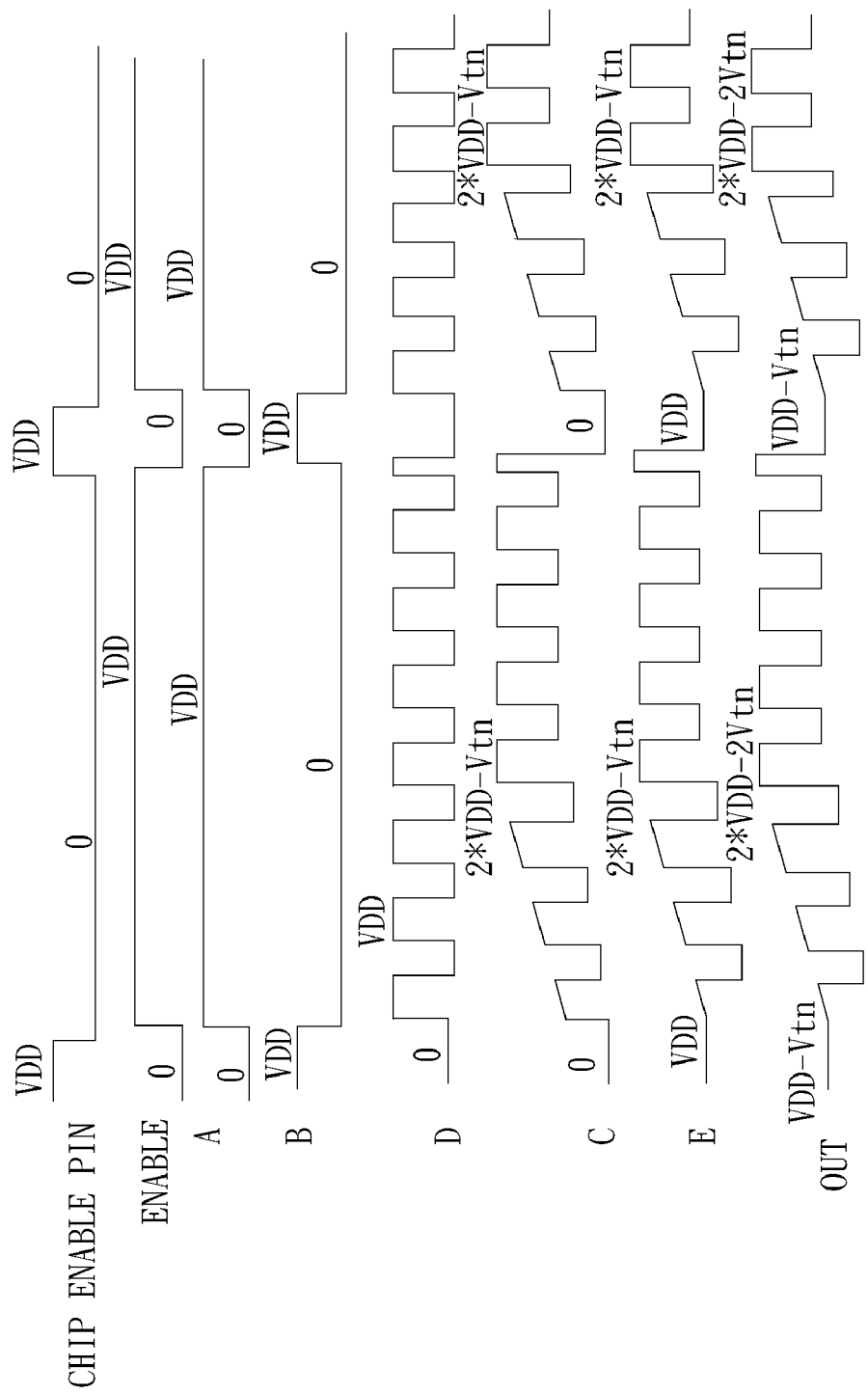
FIG. 2 is a waveform for the voltage of individual points while the circuit operated at low voltage region.
Figure 3:
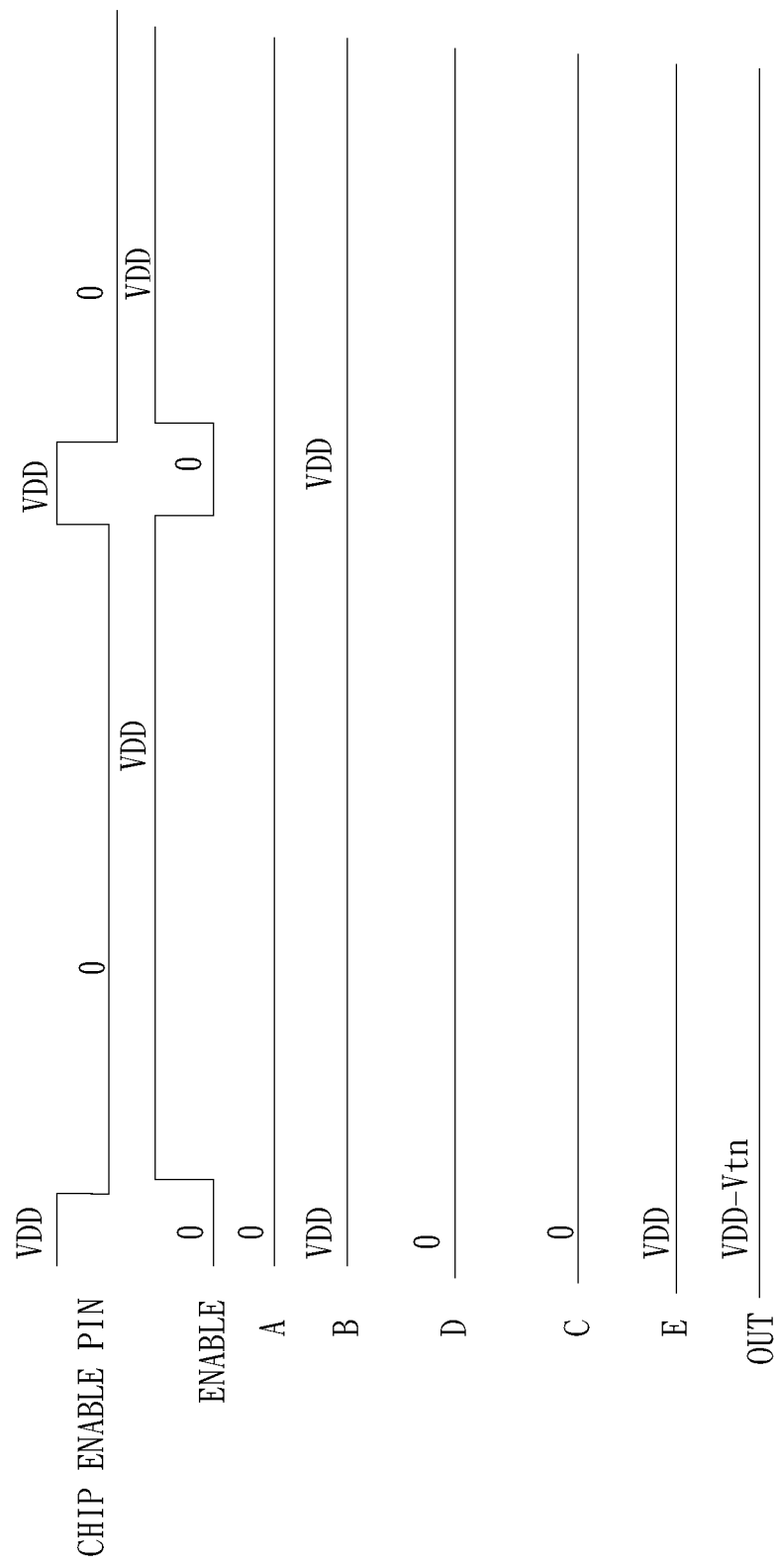
FIG. 3 is a waveform for the voltage of individual points while the circuit operated at high voltage region.

FIG. 1, FIG. 2, and FIG. 3 are a circuit diagram, an individual waveform for the circuit operating at low voltage region, and an individual waveform for the circuit operated at high voltage region respectively according to one of the preferred embodiments of the present invention for a voltage redoubling circuit. Please refer to FIG. 1, FIG. 2, and FIG. 3 simultaneously, the voltage redoubling circuit 1 of the present invention comprises: a voltage-detecting unit 2, said voltage-detecting unit 2 generates a second signal 4 after receiving a first signal 3; an oscillating unit 5, said unit 5 interconnected with said voltage-detecting unit 2, and said oscillating unit 5 generates a third signal 6 after receiving said second signal 4; an inversing unit 7, interconnected with said voltage-detecting unit 2; a first switching device 8, interconnected with said inversing unit 7; a second switching device 9, interconnected with said inversing unit 7; a third switching device 10, interconnected with said first switching device 8 and said second switching device 9; a fourth switching device 11, interconnected with said oscillating unit 5 and said third switching device 10; and a fifth switching device 12, interconnected with said third switching device 10 and said fourth switching device 11, wherein the source 13 of said third switching device 10 connected to a voltage $V_{DD}$ (also known as reference voltage). According to the different kinds of design, the voltage redoubling circuit 1 of the present invention further comprises a sixth switching device 14, said 14 interconnected with the fifth switching device 12, wherein the drain 15 and the gate 16 of said sixth switching device also interconnected to said $V_{DD}$ (also known as reference voltage). Preferably for integration and operability, the aforementioned first switching device 8, said fourth switching device 11, said fifth switching device 12 and said sixth switching device 14 are N-type metal-oxide semiconductor field-effect transistors. Preferably, said second switching device 9 and said third switching device 10 are P-type metal-oxide semiconductor field-effect transistors. The chip enable pin must be activated when the memory cell is read (The drawings do not show thereto). Before the chip enable pin being activated, the output "OUT" of said voltage redoubling circuit 1 of the present invention is pre-charged to $V_{DD}$ via the voltage level of said third switching device 10. After the chip enable pin being activated, assuming the voltage level of the first signal 3 (i.e., enable signal) received by said voltage-detecting unit 2 is 1 to activate the voltage- detecting unit 2. At the low voltage operating region (as shown in FIG. 2), the voltage level of the second signal 4 obtained from voltage-detecting unit 2 is 1, namely, "Point A," and then a second signal 4 activates the oscillating unit 5, such that the voltage level of Point B is 0, which further shutting down first switching device 8 and turning on the third switching device 9, for the time being the voltage level for point C is 1, which will shut down the third switching device 10. And while an oscillating unit 5 being activated, the voltage level for the point D will represent a vibrating square wave. As the voltage level of point D is in high voltage level, the voltage level at point E will be pumped up via said fourth switching device 11, and said pumped voltage level will be transmitted to output point "OUT" via said fifth switching device 12, pumped voltage at point E will be transmitted to point C via the second switching device 9 in order to shut down the third switching device 10 as a result the pumped output voltage of output point "OUT" will not leak current to reference voltage $V_{DD}$ via said third switching device 10. If the voltage level at point D is low, the voltage level at point E will be re-charged via said sixth switching device 14 and said third switching device 10, however; if the voltage level at point D is again turned to be high, the voltage at E will be pumped to high again via the fourth switching device 11, and the pumped high voltage will be transmitted to output point OUT via the fifth switching device 12, and the oscillating unit 5 oscillating continuously such that the voltage at point E is transmitted to output point OUT. Eventually, the voltage level of last output point OUT can be pumped two times of $V_{DD}$-two times of $V_{tn}$ (also known as "cut-off voltage", $V_{tn}$ is the characteristic parameter in MOS FET). At the high voltage operation region (suggested in FIG. 3), the output of said voltage-detecting unit 2 is 0 (namely the voltage level of point A is 0), said oscillating unit 5 will not be activated, for the time being the voltage level of point B is 1, the voltage level of point C is 0, the third switching device 10 is turned on, the voltage level of point E remains the previous reference voltage $V_{DD}$, and the output voltage level for output point OUT is $V_{DD}$-$V_{tn}$.

From the aforementioned ones skilled in the ordinary art can fully understand the present invention related to a voltage redoubling circuit, which does not need a number of pulse control signals but only an on-and-off signal to enable the circuit to function properly in the low voltage region to provide the user a way to correctly and quickly read the conducted memory cell and further minimize the hardware die size and simultaneously eliminate the mutual signal interferences in a circuit. Hence, the present invention suggests novelty, inventive step, and industry utility on the grounds of patent application and suitable for your highly esteemed examiner to grant a patent.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A voltage redoubling circuit, comprising:
    a voltage-detecting unit for receiving a first signal and outputting a second signal;
    an oscillating unit, coupled to said voltage-detecting unit for receiving said second signal;
    an inversing unit, coupled to said voltage-detecting unit for receiving said second signal and to output an inversed signal;
    a first switching device having a first source, a first drain, and a first gate, wherein said first gate is coupled to said inversing unit for receiving said inversed signal;
    a second switching device having a second source, a second drain, and a second gate, wherein said second gate coupled to said inversing unit for receiving said inversed signal;
    a third switching device having a third source, a third drain, and a third gate, wherein said third gate coupled to said first drain and said second drain;
    a fourth switching device having a fourth drain, a fourth source, and a fourth gate, wherein said fourth drain and said fourth source coupled to said oscillating unit, and said fourth gate coupled to said third source; and
    a fifth switching device having a fifth source, a fifth drain, and a fifth gate, wherein said fifth drain and said fifth gate are coupled to said third drain and fourth source.

2. The circuit as recited in claim 1, wherein said first device, fourth device, and fifth device are N-type metal-oxide semiconductor field-effect transistors.

3. The circuit as recited in claim 1, wherein said second device and third device are P-type metal-oxide semiconductor field-effect transistors.

4. The circuit as recited in claim 1, wherein said first source is connected to ground.

5. The circuit as recited in claim 3, wherein said third source is connected to a voltage source.

6. The circuit as recited in claim 1, further comprising a sixth switching device having a sixth source, a sixth drain, and a sixth gate, interconnected with said fifth switching device.

7. The circuit as recited in claim 6, wherein said sixth source and said sixth gate are connected to a voltage source.

8. The circuit as recited in claim 6, wherein said sixth device is N-type metal-oxide semiconductor field-effect transistor.

* * * * *